(12) United States Patent
Tanaka et al.

(10) Patent No.: US 9,374,371 B2
(45) Date of Patent: *Jun. 21, 2016

(54) AUTHENTICATION APPARATUS AND METHOD THEREOF, AND COMPUTER PROGRAM

(71) Applicant: Kabushiki Kaisha Toshiba, Minato-ku (JP)

(72) Inventors: Yasuyuki Tanaka, Chigasaki (JP); Mitsuru Kanda, Tokyo (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/088,609

(22) Filed: Nov. 25, 2013

(65) Prior Publication Data

US 2014/0157373 A1    Jun. 5, 2014

(30) Foreign Application Priority Data

Nov. 30, 2012    (JP) .................................. 2012-262750

(51) Int. Cl.
G06F 7/04         (2006.01)
H04L 29/06        (2006.01)

(52) U.S. Cl.
CPC ............ *H04L 63/0876* (2013.01); *H04L 63/10* (2013.01); *H04L 63/0884* (2013.01)

(58) Field of Classification Search
CPC .. H04L 63/0876; H04L 63/10; H04L 63/0884
USPC .......................................................... 726/4
See application file for complete search history.

(56) References Cited

U.S. PATENT DOCUMENTS

| | | | | |
|---|---|---|---|---|
| 2004/0213237 | A1* | 10/2004 | Yasue | H04L 63/0227 370/392 |
| 2005/0220099 | A1* | 10/2005 | Igarashi | 370/389 |
| 2006/0010484 | A1* | 1/2006 | Fujino | 726/3 |
| 2006/0259759 | A1* | 11/2006 | Maino et al. | 713/151 |
| 2007/0008942 | A1* | 1/2007 | Ocepek et al. | 370/338 |
| 2008/0155657 | A1* | 6/2008 | Ogura | H04L 63/08 726/3 |
| 2013/0227157 | A1 | 8/2013 | Tanaka | |
| 2013/0227173 | A1 | 8/2013 | Tanaka et al. | |

OTHER PUBLICATIONS

P. Duffy et al. "Protocol for Carrying Authentication for Network Access (PANA) Relay Element", Internet Engineering Task Force, ISSN:2070-1721, Aug. 2011, 12 pages.

* cited by examiner

*Primary Examiner* — Mohammad W Reza
(74) *Attorney, Agent, or Firm* — Oblon, McClelland, Maier & Neustadt, L.L.P.

(57) ABSTRACT

According to one embodiment, there is provided an authentication apparatus, including: a communication unit, a verifier and a connection configuration checker. The communication unit receives a message related to network access authentication on a first communication apparatus, the message including an address of the first communication apparatus and more than zero address of an authentication relay. The verifier verifies an authenticity of the first communication apparatus in response to receipt of the message by the communication unit. The connection configuration checker identifies a first destination to which the first communication apparatus intends to connect, on the basis of the address of the first communication apparatus or the address of the authentication relay included in the message when verification succeeds, and determines whether to authorize connection by the first communication apparatus to the first destination or not.

11 Claims, 9 Drawing Sheets

AUTHENTICATION APPARATUS AND METHOD THEREOF, AND COMPUTER PROGRAM

CROSS REFERENCE TO RELATED APPLICATIONS

This application is based upon and claims the benefit of priority from the prior Japanese Patent Application No. 2012-262750 filed on Nov. 30, 2012, the entire contents of which are incorporated herein by reference.

FIELD

Embodiments described herein relate to an authentication apparatus that performs network access authentication, and a method thereof, and a computer program.

BACKGROUND

Conventionally, a method has been known where an authentication server receives a request for network access authentication from an authentication client and performs a network access authenticating process. The conventional method has a problem in that a network access authenticating process cannot be performed in conformity with the connection configuration of the authentication client. That is, determination cannot be performed of whether to allow or reject connection in consideration of which authentication relay or network the authentication client is connected to.

For instance, it is assumed that the authentication client is a HEMS (home energy management system), and the authentication relay is a smart meter. In this case, a HEMS at a certain home may wish to allow connection to a smart meter at the same home but to prevent from being connected to a smart meter at another home. In the case of wireless communication, it is a matter of course to assume that an operation where a HEMS at a certain home intends to connect to a smart meter at another home occurs. Passwords specific to respective homes may be set in HEMSs and smart meters, and authentication processes may be performed using the passwords. Unfortunately, it is complicated for a user to set a password. On the contrary, in some cases, it may be desired that free connection to any party be allowed between smart meters, to achieve a flexible network.

DETAILED DESCRIPTION

According to one embodiment, there is provided an authentication apparatus, including: a communication unit, a verifier and a connection configuration checker.

The communication unit receives a message related to network access authentication on a first communication apparatus, the message including an address of the first communication apparatus and more than zero address of an authentication relay.

The verifier verifies an authenticity of the first communication apparatus in response to receipt of the message by the communication unit.

The connection configuration checker identifies a first destination to which the first communication apparatus intends to connect, on the basis of the address of the first communication apparatus or the addresses of the authentication relays included in the message when verification succeeds, and determines whether to authorize connection by the first communication apparatus to the first destination or not.

Hereinafter, referring to drawings, embodiments will be described.

Embodiment 1

Figure 1:
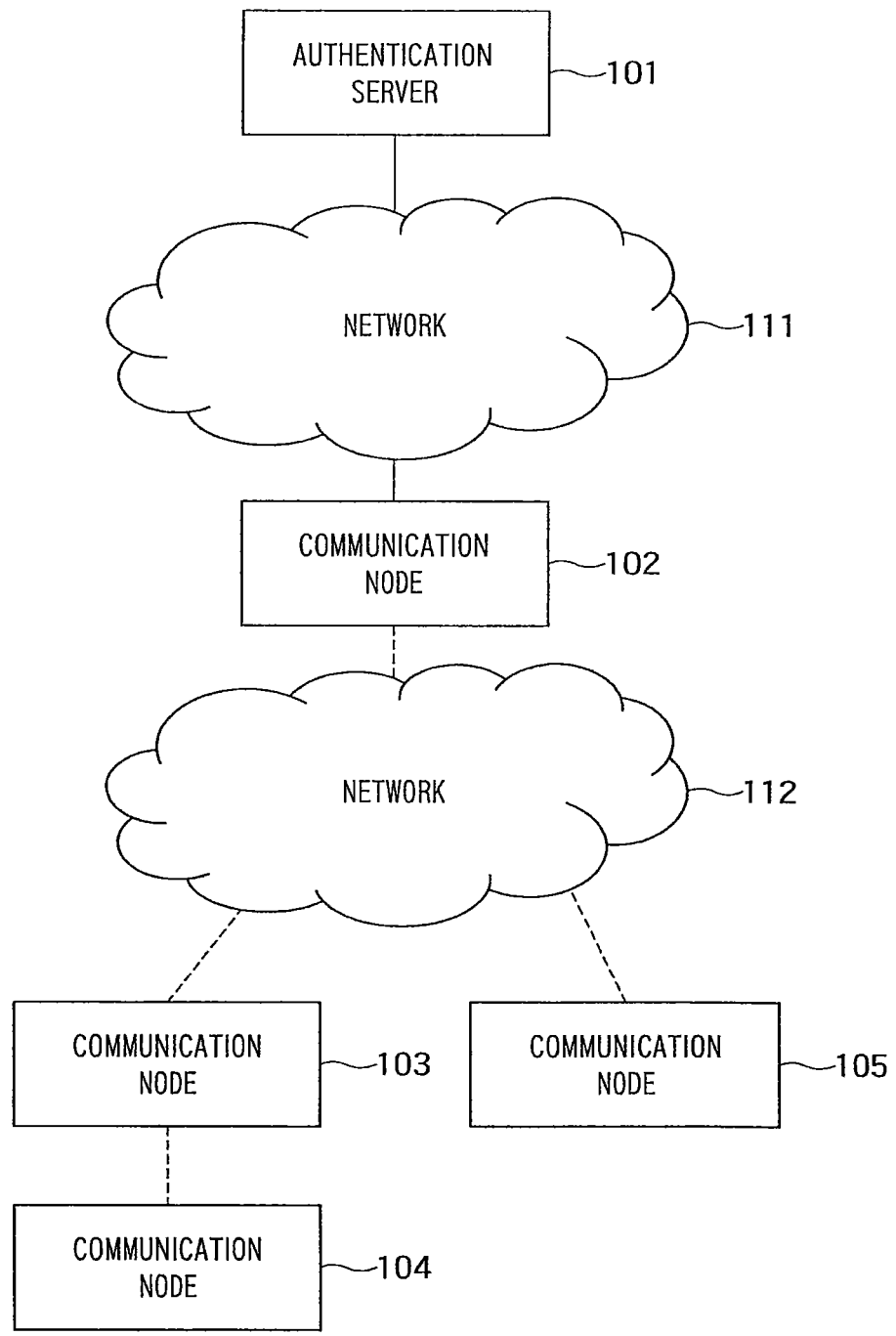
FIG. 1 is a diagram showing a network including an authentication server according to Embodiment 1.

FIG. 1 shows a network including an authentication server according to Embodiment 1.

An authentication server 101 and a communication node 102 are connected to a network 111. The communication node 102 is connected to a network 112, and manages the network 112. A communication node 103 and a communication node 105 are connected to the network 112. A communication node 104 is connected to the communication node 103. The communication nodes (here, the communication nodes 103 and 105) connected to the network 112 are capable of directly communicating with the communication nodes in the network 112, the communication node 102, the authentication server 101 and the like. The communication node 104 is capable of communicating only with the communication node 103, but incapable of communicating with the communication node 105 and the other communication nodes connected to the network 112. As specific examples of the communication nodes, it can be assumed that the communication node 102 is a concentrator, the communication nodes 103 and 105 are smart meters at different homes, and the communication node 104 is a HEMS at a home identical to that of the communication node 103. The broken lines in the diagram represent wireless connection. The solid lines represent wired connection. Note that the wireless and wired connection configuration in the diagram is an example. This embodiment is not limited thereto.

In order to protect the networks 111 and 112 from a cracker, network access authentication is necessary. That is, connection to the networks 111 and 112 and the communication nodes connected to the network 112 require network access authentication by the authentication server 101 before the connection establishment. In this embodiment, a method of configuring the network shown in FIG. 1 through network access authentication will be described.

The networks 111 and 112 include communication nodes, which are not shown in FIG. 1. Since these nodes do not have direct relationship with the description of this embodiment, the description is omitted. A communication scheme used by the networks 111 and 112, the authentication server 101, and each communication node may be any of schemes, such as communication by wired connection (Ethernet, power line telecommunication, etc.), communication by wireless connection (wireless LAN, low power radio, etc.), and combination thereof. According to a typical configuration, the communication node 102 connected to both the networks 111 and 112 functions as a concentrator, a base station and a gateway of the network 112, and constructs, manages and maintains the network 112.

Figure 2:
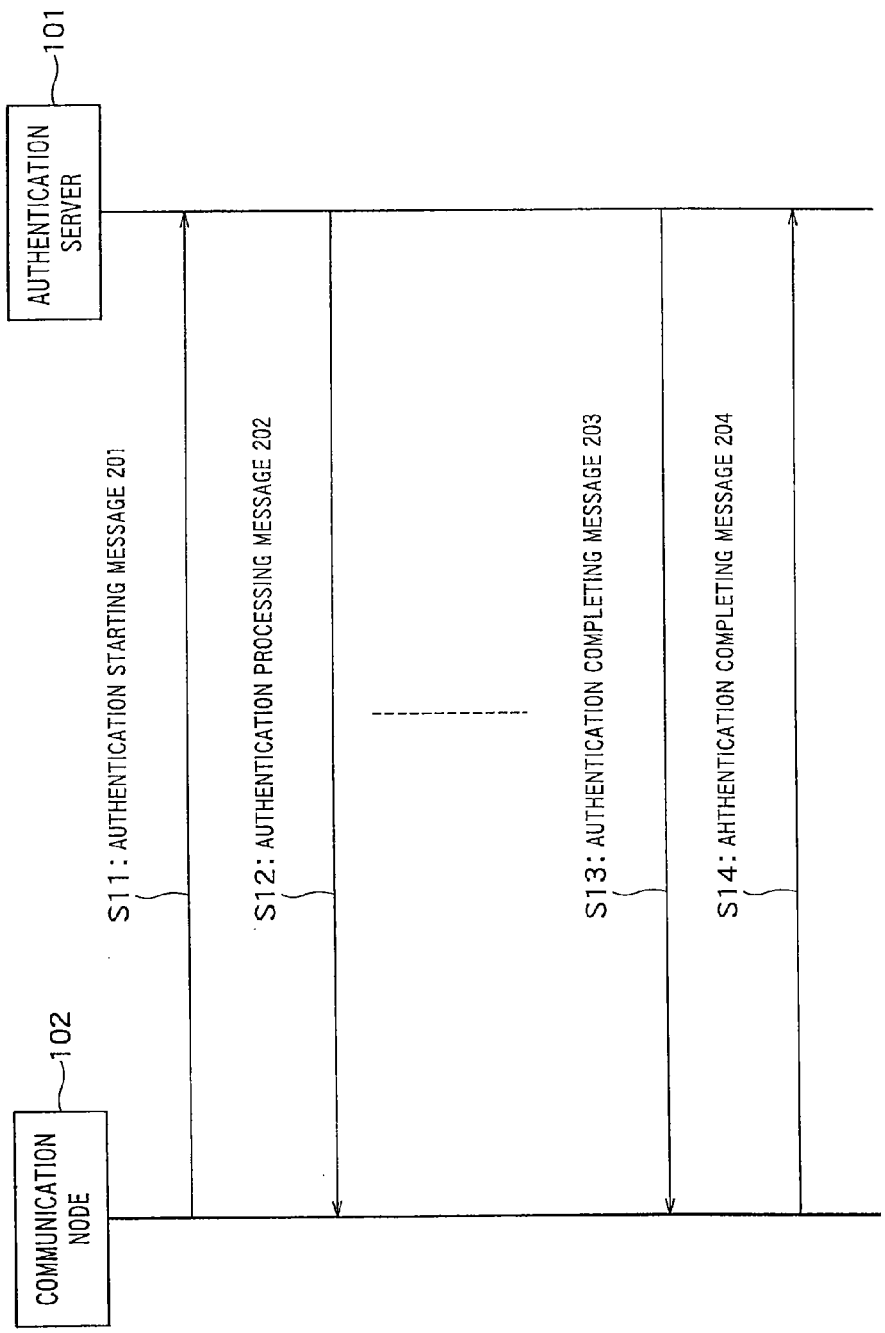
FIG. 2 is a diagram showing an example of a message sequence of network access authentication on a communication node.

FIG. 2 shows a message sequence of network access authentication on the communication node 102.

Before network access authentication, the communication node 102 is only capable of communication that pertains to network access authentication and is performed with the authentication server 101 via the network 111. First, the communication node 102 transmits an authentication starting message 201 to the authentication server 101 (S11). Upon receipt of the authentication starting message 201, the authentication server 101 transmits an authentication processing message 202 to the communication node 102 (S12). After multiple exchanges of the authentication messages, the authentication server 101 finally transmits an authentication completion message 203 (S13), and the communication node 102 transmits an authentication completing message 204 (S14). Thus, the network access authenticating process is completed. Subsequently, the communication node 102 is notified of successful network access authentication from the authentication server 101, thereby establishing connection to the network 111. The communication node 102, having achieved the connection to the network 111, establishes the network 112 managed by this node itself.

Figure 3:
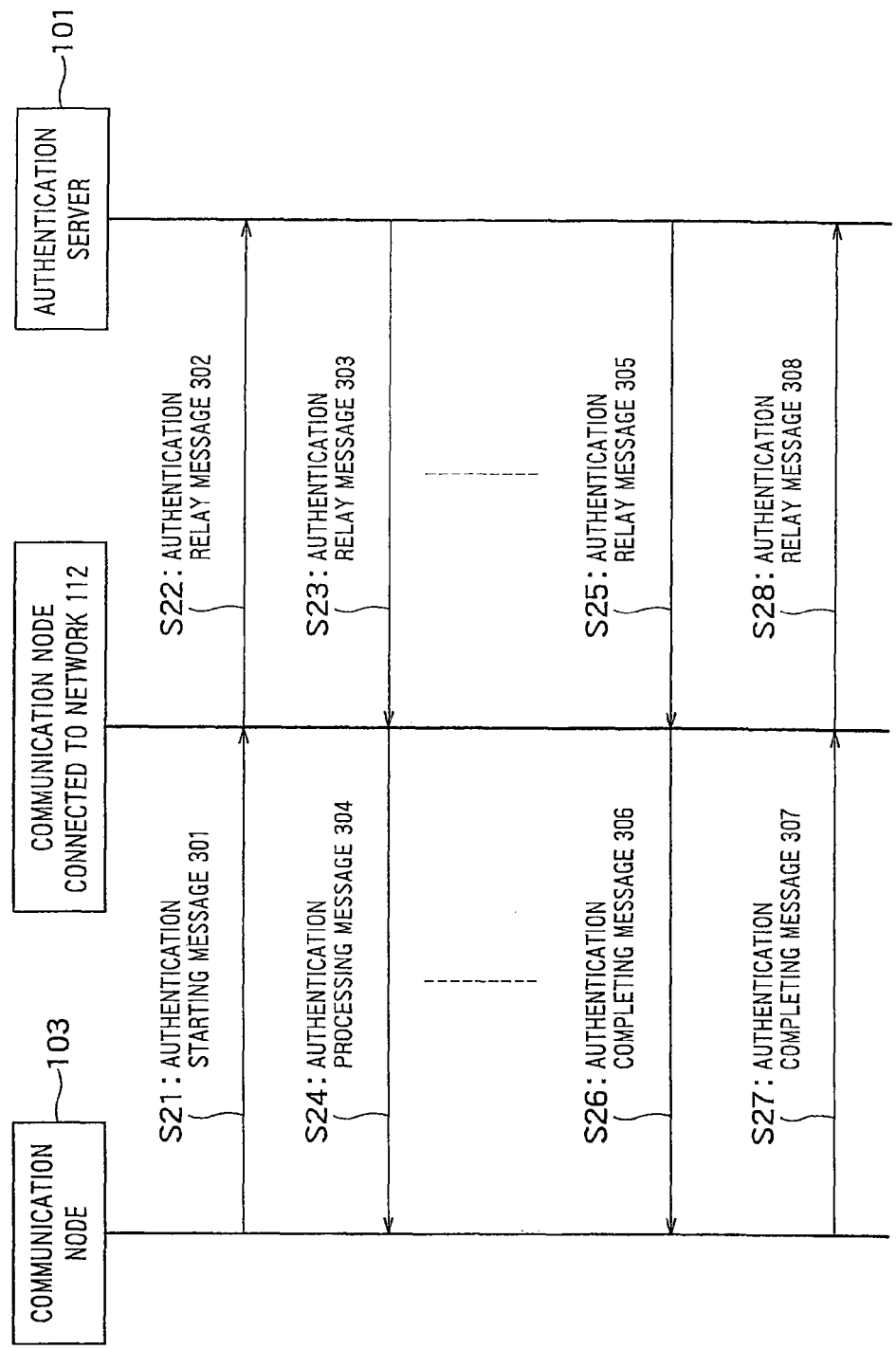
FIG. 3 is a diagram showing an example of a message sequence of network access authentication on a communication node.

FIG. 3 shows a message sequence of network access authentication on the communication node 103.

The communication node 103 is incapable of directly communicate with the authentication server 101 before connection to the network 112. Accordingly, the communication node 103 uses a communication node having already been connected to the network 112, as an authentication relay, to be subjected to network access authentication by the authentication server 101. The operation of the communication node 103 during network access authentication is basically analogous to that of the communication node 102 during network access authentication.

An authentication relay, which is a communication node having already been connected to the network 112, receives an authentication starting message 301 for network access authentication, from the communication node 103 (S21). This relay constructs an authentication relay message 302 on the basis of the authentication starting message 301, and transmits the authentication relay message 302 to the authentication server 101 (S22).

Figure 4:
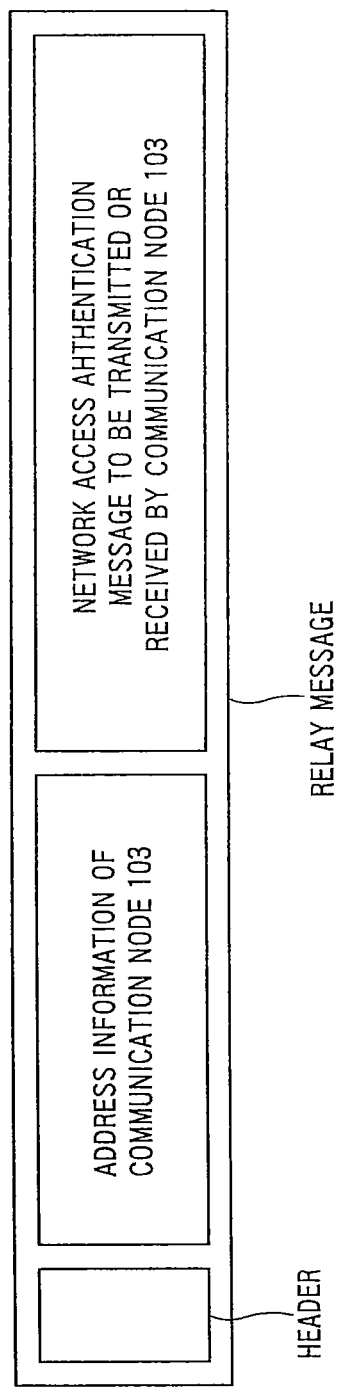
FIG. 4 is a diagram showing an example of an authentication relay message.

FIG. 4 shows the authentication relay message. The authentication relay message is transmitted and received between the communication node 103 and the authentication server 101. The authentication relay message includes a network access authentication message transmitted by the communication node 103 or a network access authentication message to be received by the communication node 103. The authentication relay message includes address information of the communication node 103 and a header. The source address in the header of the authentication relay message to be transmitted from the authentication relay to the authentication server 101 is the address of the authentication relay.

The authentication relay receives an authentication relay message 303 from the authentication server 101 (S23). The authentication relay extracts, from the authentication relay message 303, a network access authentication message destined to the communication node 103, and transmits an authentication processing message 304 including the authentication message, to the communication node 103 (S24). Such use of the authentication relay allows network access authentication without direct communication between the communication node 103 and the authentication server 101.

Here, the communication node used as the authentication relay may be any node having already been connected to the network 112. Accordingly, the communication node 102 may be the authentication relay. Instead, a communication node in the network 112, which is not shown in FIG. 1, may be the authentication relay. A method of finding the communication node to be used as the authentication relay by the communication node 103 may be any method. For instance, the method may be a method of searching for a communication node usable as the authentication relay using broadcast messages or multicast messages. Instead, the method may be a method of using a beacon transmitted from the communication node connected to the network 112. Another method may be used.

The authentication server 101 transmits an authentication relay message 305 including an authentication completing message to the authentication relay (S25). The authentication relay extracts the authentication completing message from the authentication relay message 305, and transmits an authentication completing message 306 to the communication node 103 (S26). The communication node 103 transmits an authentication completing message 307 to the authentication relay (S27). The authentication relay constructs an authentication relay message 308 on the basis of the authentication completing message 307, and transmits the authentication relay message 308 to the authentication server 101 (S28). Thus, the network access authenticating process is completed.

After being notified of successful network access authentication by the authentication server 101, the communication node 103 can be connected to the network 112. Thereafter, the communication node 103 can exchange messages other than on the network access authentication, with the communication node in the network 112, and directly communicate with the communication node 102 and the authentication server 101.

The network access authentication on the communication node 105 is analogous to that on the communication node 103.

The network access authentication on the communication node 104 is also analogous to that on the communication node 103. The communication node 104 uses the communication node 103 as the authentication relay. After being notified of successful network access authentication by the authentication server 101, this node can be connected to the communication node 103. Thereafter, the communication node 104 can exchange messages other than the network access authentication with the communication node 103.

However, in the case where the communication node 104 uses the communication node 105 as the authentication relay, the authentication server 101 notifies, to the communication node 104, failed network access authentication. This is because the communication node 105 is not registered as a access point to which the communication node 104 can be connected, in an after-mentioned connection configuration control table. The failures notified by the authentication server 101 to the communication node are classified into a failure of authentication itself (authentication rejected) or authorization rejected. In this embodiment, in the case where the communication node 104 uses the communication node 105 as the authentication relay, the authenticity of the communication node 104 is successfully verified in the authentication server 101 but the authorization is rejected. The authentication server 101 notifies, to the communication node 104, failed network access authentication due to rejected authorization.

Thus, in the network access authenticating process, the authentication server 101 not only verifies the authenticity of the communication node but also determines whether network access authentication succeeds or not in consideration of the connection configuration of the communication node such as the network to which the communication node intends to connect.

Figure 5:
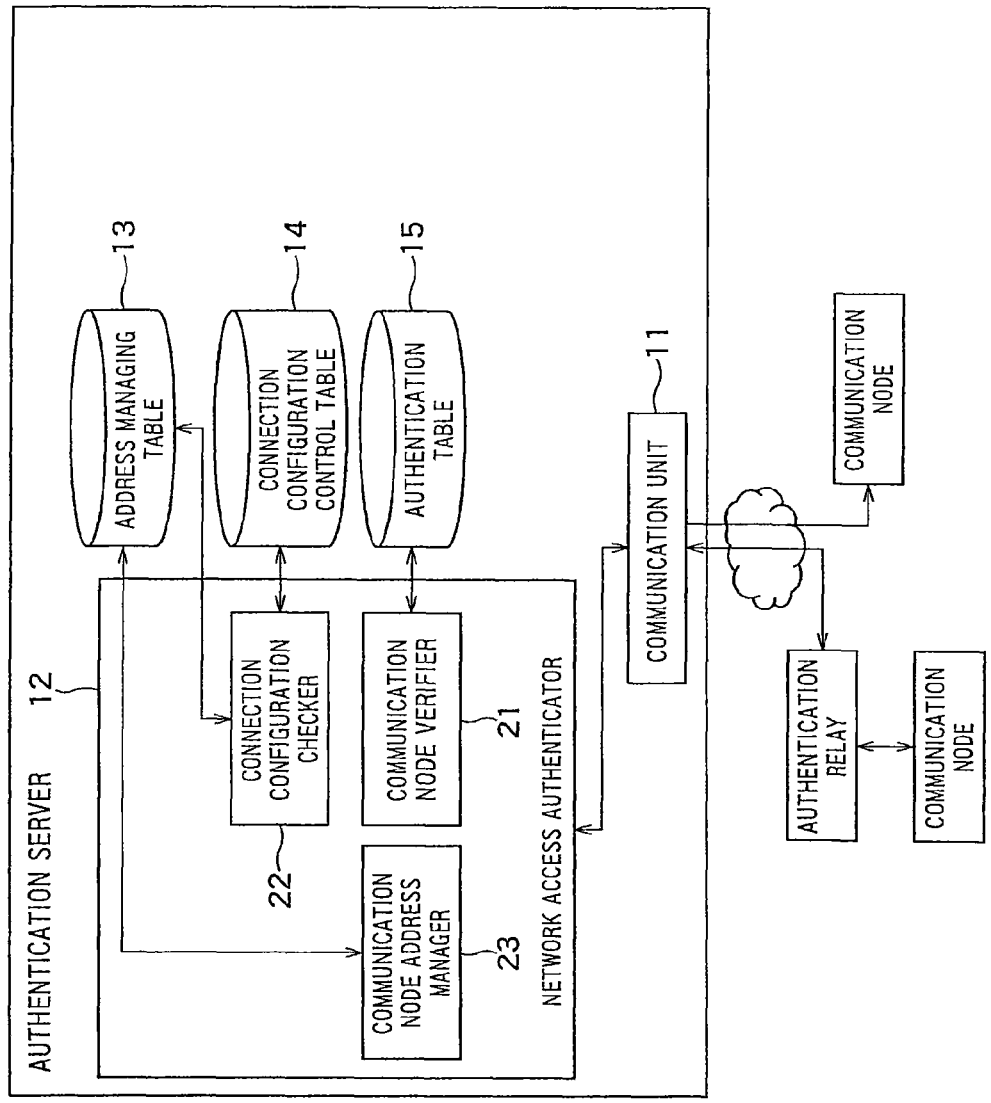
FIG. 5 is a diagram of the authentication server according to Embodiment 1.

FIG. 5 shows a diagram of the authentication server 101.

The authentication server 101 includes a communication unit 11, a network access authenticator 12, an authentication table 15, a connection configuration control table 14, and an address managing table 13. The network access authenticator 12 includes a communication node verifier 21, a connection configuration checker 22, and a communication node address manager 23.

The communication unit 11 performs communication that pertains to network access authentication and is performed with the communication node and the authentication relay via the network 111. The network access authentication message received by the communication unit 11 is passed to the network access authenticator 12. The message to be transmitted by the network access authenticator 12 to the communication node or the authentication relay is transmitted from the communication unit 11 to the network 111.

The communication node verifier 21 refers to the authentication table 15, and verifies the authenticity of the communication node according to a predetermined authentication method. If verification fails, the network access authenticator 12 notifies, to the communication node, failed network access authentication due to rejection. If successfully verified, the processing proceeds to that in the connection configuration checker 22. The content of the authentication table 15 may be various according to the authentication methods used for network access authentication. For instance, the method may be combinations of user names and passwords, information on digital certificates, biological information and the like. Here, for the sake of simplicity, it is assumed that the communication node is authenticated using the identifier of the communication node and a pre-shared key. Table 1 shows an example of the authentication table 15. The communication node verifier 21 refers to the authentication table 15, and verifies the authenticity of the communication node according to the predetermined authentication method.

TABLE 1

Example of authentication table in Embodiment 1

| Identifier | Pre-shared key |
|---|---|
| node102@example.com | f5d86b5debddfdbc |
| node103@example.com | d2d15b2ffff106a9 |
| node104@exampe.com | 1d710fcc6faf180a |
| node105@example.com | 6bc510bc3ca89f4d |
| node106@example.com | b8300d7d9cdcfea6 |

Table 2 shows an example of the connection configuration control table. In the connection configuration control table 14, the identifiers of the communication nodes, and networks or communication nodes to which the communication nodes can be connected are set. In the connection configuration control table, the connectable networks and communication nodes are set on a communication node basis according to the policy of the entire system, service providing schemes, etc. In this example, the identifier of the communication node 102 is "node2@example.com", the identifier of the communication node 103 is "node3@example.com", the identifier of the communication node 104 is "node4@example.com", the identifier of the communication node 105 is "node5@example.com".

TABLE 2

Example of connection configuration control table in Embodiment 1

| Identifier | Connectable network or communication node |
|---|---|
| node2@example.com | network 111, network 112 |
| node3@example.com | network 112, node4@example.com |
| node4@example.com | node3@example.com |
| node5@example.com | network 112 |

Table 3 shows an example of the address managing table. The address managing table shows the addresses of networks and communication nodes to which the communication nodes can be connected. The authenticated communication nodes, and the networks managed by the communication nodes, as necessary, are registered. Table 3 shows an example of the address managing table before completion of the network access authentication on the communication node 102. Before completion of the network access authentication on the communication node 102, the network address of the network 111 and a time on which the information thereof was registered are set. Upon occurrence of the authenticated communication node, the communication node address manager 23 registers the address of the authenticated communication node, and the address of the network in the case where the communication node constructs the network, on the address managing table.

TABLE 3

Example of the address managing table in Embodiment 1 (before completion of network access authentication on communication node 102)

| Row number | Identifier | Address | Latest update time |
|---|---|---|---|
| 1 | network 111 | 2001:DB8:1::/64 | 10:32:29, Oct. 1, 2012 |

The connection configuration checker 22 identifies the network and the communication nodes to which the communication node requesting authentication can be connected, on the basis of the connection configuration control table 14. The connection configuration checker 22 acquires the addresses of the identified network and communication nodes, from the address managing table 13, and determines whether the address of the communication node requesting authentication (the address of the authentication relay in the case of intervention by the authentication relay) matches with one of the acquired addresses. If no address matching with the address of the communication node (or the address of the authentication relay) is included in the acquired addresses, it is determined that the authorization is rejected. The network access authenticator 12 notifies, to the communication node requesting authentication, failed network access authentication due to rejected authorization. In contrast, if an matching address exists, it is determined that the communication node requesting the authentication intends to connect to the communication node or network having the matching address, and the connection configuration checker 22 determines to allow authorization on connection to the communication node or the network. The network access authenticator 12 notifies, to the communication node requesting authentication, successful network access authentication.

Instead, the communication apparatus or network to which the communication node requesting authentication intends to connect may be identified on the basis of the address managing table 13, and a registered item in the connection configuration control table may be identified as a destination among the identified items, thereby allowing authorization on connection to the destination.

Hereinafter, an example where the authentication server 101 performs network access authentication on the communication node 102 in the states of Tables 1 to 3 will be described.

Upon receipt of the message from the communication node 102, the communication node verifier 21 of the authentication server 101 verifies the authenticity of the communication node 102 on the basis of the authentication table of Table 1, and checks that the communication node 102 is authentic. The connection configuration checker 23 acquires the identifiers of the network and communication nodes to which the communication node 102 can be connected, from the connection configuration control table of Table 2. The communication node address manager 23 acquires the addresses of the connectable network and communication nodes from the address managing table of Table 3. In this example, the communication node 102 can be connected to the networks 111 and 112 according to Table 2. The address of the network 111 is identified as "2001:DB8:1::/64" on the basis of the address managing table.

Next, the network access authenticator 12 acquires the address of the authentication relay used by the communication node 102 for network access authentication. In the case of the authentication client that directly communicate with the authentication server without use of the authentication relay as with the communication node 102, the address of the authentication client is acquired. In this example, the address of the communication node 102 (assuming "2001:DB8:1::1234") is acquired.

The acquired address is compared with the addresses of the network and communication nodes that are authorized to be connected, and it is checked whether or not the address of the communication node 102 matches with the addresses of the network or communication nodes that are authorized to be connected. In this example, the address of the communication node 102 "2001:DB8:1::1234" is included in the address "2001:DB8:1::/64" of the network 111 to which the communication node 102 can be connected ("/64" indicates high-order 64 bits). Accordingly, the network access authenticator 12 determines to allow connection of the communication node 102, and notifies successful authentication to the communication node 102.

In the case where neither the network nor communication nodes that have authorization to access the communication node 102 are registered in the connection configuration control table at all or the case where no address matching with any of the addresses of the network and the communication nodes acquired from the connection configuration control table is included in the address managing table, the network access authenticator 12 notifies, to the communication node 102, failed network access authentication due to rejected authorization.

After the network access authentication on the communication node 102 succeeds, the authentication server 101 registers the identifier and the address of the communication node 102 on the address managing table.

Table 4 shows an example of the address managing table after completion of the network access authentication on the communication node 102. In this example, in addition to the content of Table 3, the address of the communication node 102 is further added. Moreover, the addresses of the network 112 configured by the communication node 102 (three in this example) is also added. The addresses of the network 112 may be notified by the communication node 102, or preset.

TABLE 4

Example of address managing table in Embodiment 1
(after completion of network access authentication on communication node 102)

| Row number | Identifier | Address | Latest update time |
|---|---|---|---|
| 1 | network 111 | 2001:DB8:1::/64 | 10:32:29, Oct. 1, 2012 |
| 2 | node2@example.com | 2001:DB8:1::1234 | 07:03:12, Oct. 20, 2012 |
| 3 | network 112 | 2001:DB8:0:1001/64 2001:DB8:0:2002/64 2001:DB8:0:3003/64 | 07:04:10, Oct. 20, 2012 |

As with the network access authentication on the communication node 102, first, the authenticity is verified by the communication node verifier 21 for network access authentication on the communication nodes 103 and 105. Subsequently, the connection configuration checker 22 confirms whether or not the communication nodes 103 and 105 intend to connect to the network or communication nodes to which connection is allowed, on the basis of the connection configuration control table and the address managing table.

The difference from the network access authentication on the communication node 102 is that the connection configuration checker 22 does not use the addresses of the communication nodes 103 and 105 but uses the address of the authentication relay used by these communication nodes. The address of the authentication relay is compared with the addresses of the network and communication nodes to which the communication nodes 103 and 105 are authorized to be connected, thereby confirming whether or not the communication nodes 103 and 105 intend to connect to the network or communication node to which connection is allowed.

After the network access authentication on the communication nodes 103 and 105, the communication node address manager 23 registers the addresses of the communication nodes 103 and 105 on the address managing table 13. Table 5 shows the address managing table after completion of the network access authentication on the communication nodes 103 and 105.

TABLE 5

Example of the address managing table in Embodiment
1 (after network access authentication on the communication nodes 103 and 105)

| Row number | Identifier | Address | Latest update time |
|---|---|---|---|
| 1 | network 111 | 2001:DB8:1::/64 | 10:32:29, Oct. 1, 2012 |
| 2 | node2@example.com | 2001:DB8:1::1234 | 07:03:12, Oct. 20, 2012 |
| 3 | network 112 | 2001:DB8:0:1001/64 2001:DB8:0:2002/64 2001:DB8:0:3003/64 | 07:04:10, Oct. 20, 2012 |

TABLE 5-continued

Example of the address managing table in Embodiment
1 (after network access authentication on the communication
nodes 103 and 105)

| Row number | Identifier | Address | Latest update time |
|---|---|---|---|
| 4 | node3@example.com | 2001:DB8:0:1001::abcd | 11:40:20, Oct. 21, 2012 |
| 6 | node5@example.com | 2001:DB8:0:1001::1234 | 12:12:32, Oct. 19, 2012 |

Next, the case where the authentication server 101 performs network access authentication on the communication node 104 will be exemplified. As with the case of the communication node 103, first, the authenticity of the communication node 104 is verified for the case of the communication node 104. Subsequently, the network and communication nodes to which the communication node 104 is authorized to be connected is identified on the basis of the connection configuration control table 14, and the addresses of the network and communication nodes are identified on the basis of the address managing table 13. The connection configuration checker 22 then uses the address of the authentication relay used by the communication node 104 to check whether or not the address of the authentication relay matches with the addresses of the network and the communication nodes to which the communication node 104 is authorized to be connected.

Here, a case where the address of the authentication relay used by the communication node 104 is "2001:DB8:0:1001::1234" is exemplified. In this case, the connection configuration checker 22 identifies that the node to which the communication node 104 is authorized to be connected is the communication node 103 on the basis of the address managing table 13. The address of the communication node 103 is identified as "2001:DB8:0:1001::abcd" on the basis of the address managing table 13. Since the address of the communication node 103 does not match with the address of the authentication relay, it is determined that the communication node 104 intends to connect to the communication node or network to which is unauthorized. Accordingly, the network access authenticator 12 notifies, to the communication node 104, failed network access authentication due to rejected authorization.

Next, a case where the address of the authentication relay used by the communication node 104 is "2001:DB8:0:1001::abcd" is exemplified. In this case, the connection configuration checker 22 identifies that the node to which the communication node 104 is authorized to be connected is the communication node 103 on the basis of the connection configuration control table 14. The address of the communication node 103 is identified as "2001:DB8:0:1001::abcd" on the basis of the address managing table 13. It is then detected that the address of the communication node to which the communication node 103 is authorized to be connected matches with the address of the authentication relay. Thus, the connection configuration checker 22 determines that the communication node 104 intends to connect to the communication node to which connection is allowed, and notifies, to the communication node 104, successful network access authentication.

Table 6 shows the address managing table after completion of the network access authentication on the communication node 104. The address of the communication node 104 is added.

TABLE 6

Example of address managing table in Embodiment 1
(after network access authentication on communication node
104)

| Row number | Identifier | Address | Latest update time |
|---|---|---|---|
| 1 | network 111 | 2001:DB8:1::/64 | 10:32:29, Oct. 1, 2012 |
| 2 | node2@example.com | 2001:DB8:1::1234 | 07:03:12, Oct. 20, 2012 |
| 3 | network 112 | 2001:DB8:0:1001/64 2001:DB8:0:2002/64 2001:DB8:0:3003/64 | 07:04:10, Oct. 20, 2012 |
| 4 | node3@example.com | 2001:DB8:0:1001::abcd | 11:40:20, Oct. 21, 2012 |
| 5 | node5@example.com | 2001:DB8:0:1001::1234 | 12:12:32, Oct. 19, 2012 |
| 6 | node4@example.com | 2001:DB8:1000:1000::100 | 18:25:40, Nov. 1, 2012 |

Although omitted in the above description, after completion of connection to the desired network or communication node due to successful network access authentication, each communication node may notify, to the authentication server 101, the latest address thereof through an address updating process or a re-authenticating process. Thus, the communication node address manager 23 allows the addresses of the communication nodes to be maintained in the latest state in the address managing table 13. When the connection configuration checker 23 compares the address column of the address managing table 13 on the basis of the address of the communication node and the address of the authentication relay, not only longest matching but also matching on a specific part of the address may be performed. For instance, in the case of a host address, comparison only on lower-order 64 bits may be performed.

Figure 6:
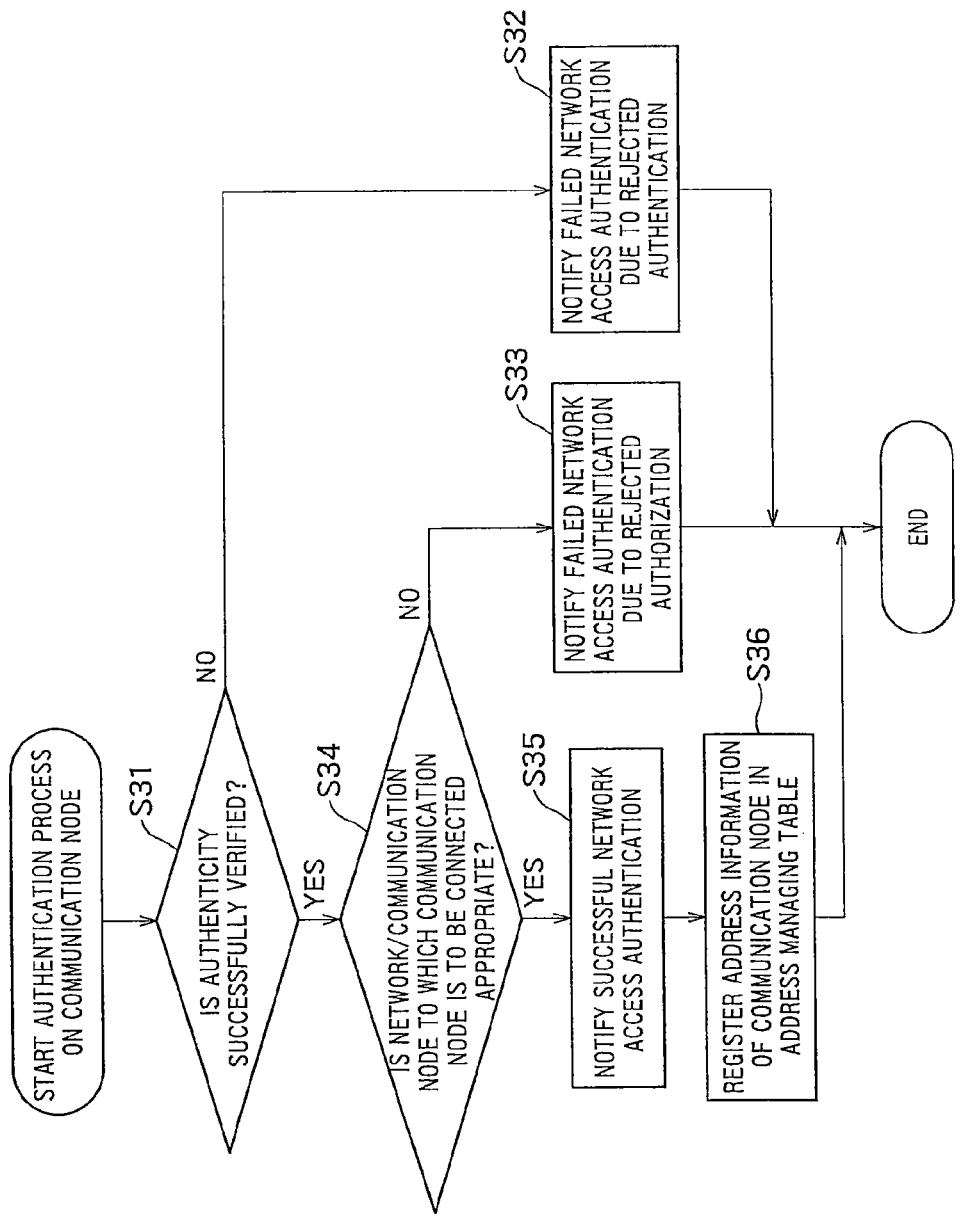
FIG. 6 is a flowchart showing a flow of processes of the authentication server according to Embodiment 1.

FIG. 6 shows a flowchart illustrating a process flow of the authentication server 101.

When the authentication server 101 starts authentication on the communication node, the communication node verifier 21 verifies the authenticity of the communication node (S31). If verification fails, the network access authenticator 12 notifies, to the communication node, failed network access authentication due to rejected authentication (S32).

If verification succeeds, the connection configuration checker 22 checks whether connection to the network and communication node to which the communication node intends to connect is allowed or not on the basis of the connection configuration control table 14 and the address managing table 13 (S34). If not allowed, the network access authenticator 12 notifies, to the communication node, failed network access authentication due to rejected authorization (S33). If allowed, the network access authenticator 12 notifies, to the communication node, successful network access authentication (S35). The communication node address manager 23 registers the address of the successfully authenticated communication node, and the network constructed and managed by the communication node, as necessary, together with the identifier of the communication node, on the address managing table 13 (S36).

In the embodiment described above, RFC 5191 (PANA) may be used as an example of the network access authentication protocol, and RFC 6345 may be used for the operation of the authentication relay. However, the protocol for use and the communication scheme are not limited thereto.

The authentication server 101 may notify, to the successfully authenticated communication node, not only successful network access authentication but also key information used for communication with the network or the communication node that is a destination. The key information includes at least the value of the key, and may further include the range of use of the key, the identifier of the key, and the expiration date.

The authentication server 101 may notify, to the successfully authenticated communication node, not only successful network access authentication but also communication control information with the network or communication node that is a destination. For instance, various examples of the communication control information may be adopted. The examples include information on a channel (frequency) used for communication and communication frequency, logical network names (e.g., PANID and ESSID), the communication rate setting and the upper limit of communication rate, and a frequency hopping pattern. The communication node receiving the communication control information communicates according to the communication control information. For instance, in the case where the communication frequency is regulated in the communication control information, the communication node performs control so as not to exceed the designated communication frequency.

If the network access authentication on the communication node succeeds, the authentication server 101 may notify, to the authentication relay used by the communication node, successful network access authentication on the communication node and authorization permission with the communication node. The content of authorization permission may include, not only the address of successfully authenticated communication node but also a policy of which communication may be allowed, the key information used for communication with the communication node, and the communication control information.

As described above, according to this embodiment, the authentication server can perform network access authentication on the communication node in consideration of the connection configuration of the communication node.

Embodiment 2

Figure 7:
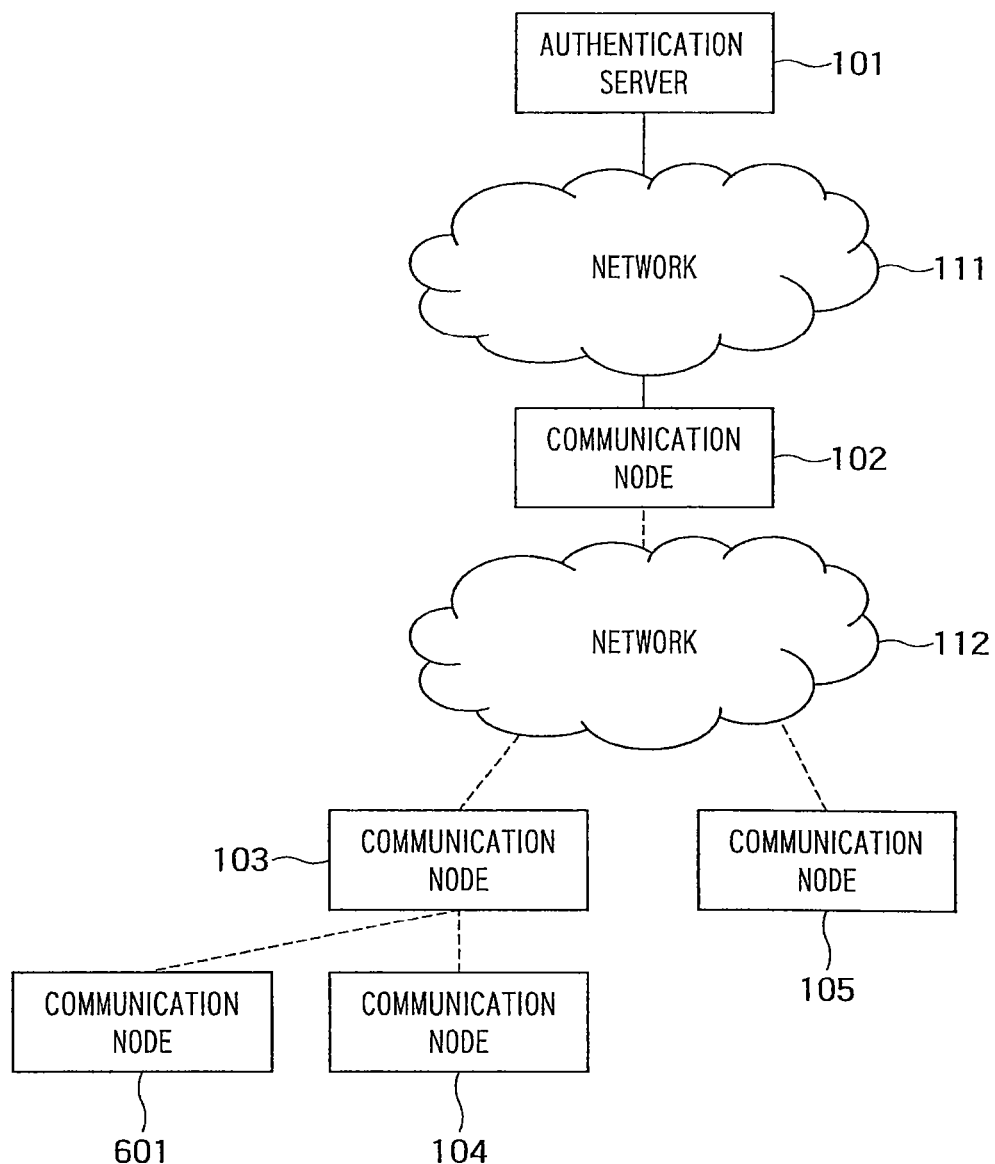
FIG. 7 is a network diagram of Embodiment 2.

FIG. 7 shows a network diagram in Embodiment 2.

In Embodiment 2, not only the communication node 104 but also a communication node 601 is connected to the communication node 103 in Embodiment 1. The identifier of the communication node is "node6@example.com". As specific examples of the communication nodes, the communication node 102 may be a concentrator, the communication nodes 103 and 105 may be smart meters at different homes, the communication nodes 104 and 601 may be a HEMS and a gas meter at the home identical to that of the communication node 103.

In order to communicate with the communication node 103, the communication node 601 uses the communication node 103 as an authentication relay, and subjected to network access authentication by the authentication server 101. Table 7 shows an example of a connection configuration control table in Embodiment 2. The identifier of the communication node 601 is defined as "node6@example.com".

TABLE 7

Example of connection configuration control table in Embodiment 2

| Identifier | Connectable network or communication node |
|---|---|
| node2@example.com | network 111, network 112 |
| node3@example.com | network 112, node4@example.com, node6@example.com |
| node4@example.com | node3@example.com |
| node5@example.com | network 112 |
| node6@example.com | node3@example.com |

The authentication server 101 performs processes analogous to those in Embodiment 1, and notifies successful network access authentication only when determining that the communication node 601 intends to connect to the communication node 103. The specific operation of the communication node 601 during network access authentication is analogous to that of the communication node 104 in Embodiment 1.

As described above, according to this embodiment, the authentication server can perform network access authentication on the plural communication nodes in consideration of the configuration where the plural communication nodes are connected to one communication node.

Embodiment 3

Embodiment 3 is different in that the communication node 601 in Embodiment 2 is also capable of communicating with the communication node 104. That is, any two communication nodes of the communication nodes 103, 104 and 601 are capable of communicating with each other.

Table 8 shows an example of a connection configuration control table in Embodiment 3.

TABLE 8

Example of connection configuration control table in Embodiment 3

| Identifier | Connectable network or communication node |
|---|---|
| node2@example.com | network 111, network 112 |
| node3@example.com | network 112, node4@example.com, node6@example.com |
| node4@example.com | node3@example.com, node6@example.com |
| node5@example.com | network 112 |
| node6@example.com | node3@example.com, node4@example.com |

A case is exemplified where after network access authentication on the communication nodes 103 and 104 succeeds, the authentication server 101 performs a network access authenticating process on the communication node 601. After successful network access authentication on the communication node 601, the authentication server 101 may issue instructions for allowing communication with the communication node 601, to the communication nodes 103 and 104, while notifying the success to the communication node 601. In the case where the authentication server 101 is incapable of directly communicating with the communication node 104, the server may request the communication node 103 to cause the communication node 104 to notify, to the communication node 601, authorization permission for communicating with the communication node 104.

As described above, according to this embodiment, communication between the communication nodes with successful network access authentication can be controlled.

Embodiment 4

Figure 8:
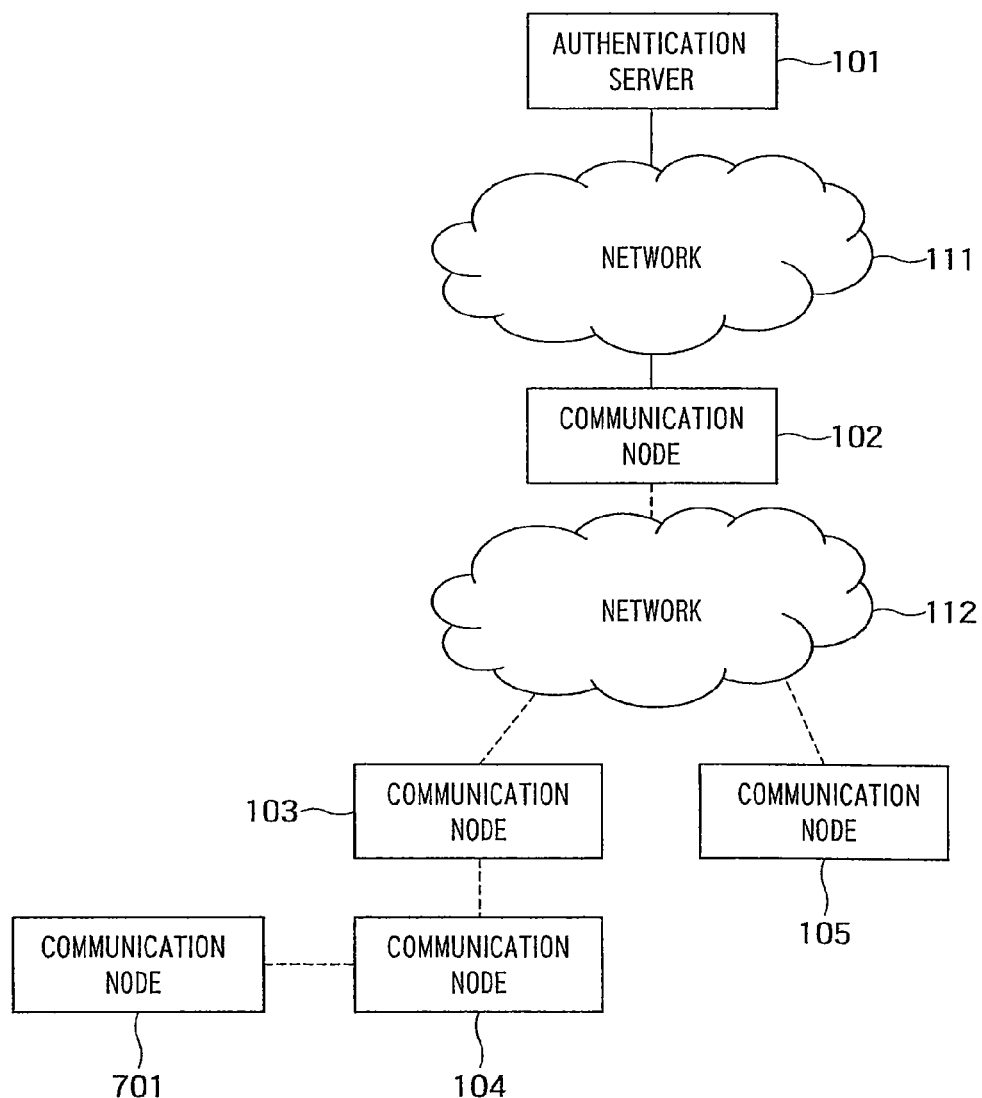
FIG. 8 is a network diagram of Embodiment 4.

FIG. 8 shows a network diagram in Embodiment 4.

In Embodiment 4, a communication node 701 is subordinately connected to the communication node 104, which is connected to the communication node 103. The identifier of the communication node 701 is defined as "node7@example.com". As specific examples of the communication nodes, the communication node 102 may be a concentrator, the communication nodes 103 and 105 may be smart meters at different homes, the communication node 104 may be a HEMS in the home identical to that of the communication node 103, and the communication node 701 may be a storage battery.

In order to communicate with the communication node 104, the communication node 701 uses the communication node 104 as an authentication relay, and is subjected to network access authentication by the authentication server 101. Table 9 shows an example of the connection configuration control table in Embodiment 4. The identifier of the communication node 701 is defined as "node7@example.com".

TABLE 9

Example of connection configuration control table in Embodiment 4

| Identifier | Connectable network or communication node |
| --- | --- |
| node2@example.com | network 111, network 112 |
| node3@example.com | network 112, node4@example.com |
| node4@example.com | node3@example.com, node7@example.com |
| node5@example.com | network 112 |
| node7@example.com | node4@example.com |

In order to connect the communication node 701 to the communication node 104, the communication node 104 is required to serve as an authentication relay, and network access authentication is required to be performed by the authentication server 101. Here, in the case where the communication node 104 is incapable of directly communicating with the authentication server 101, the communication node 103 is further used as an authentication relay.

Figure 9:
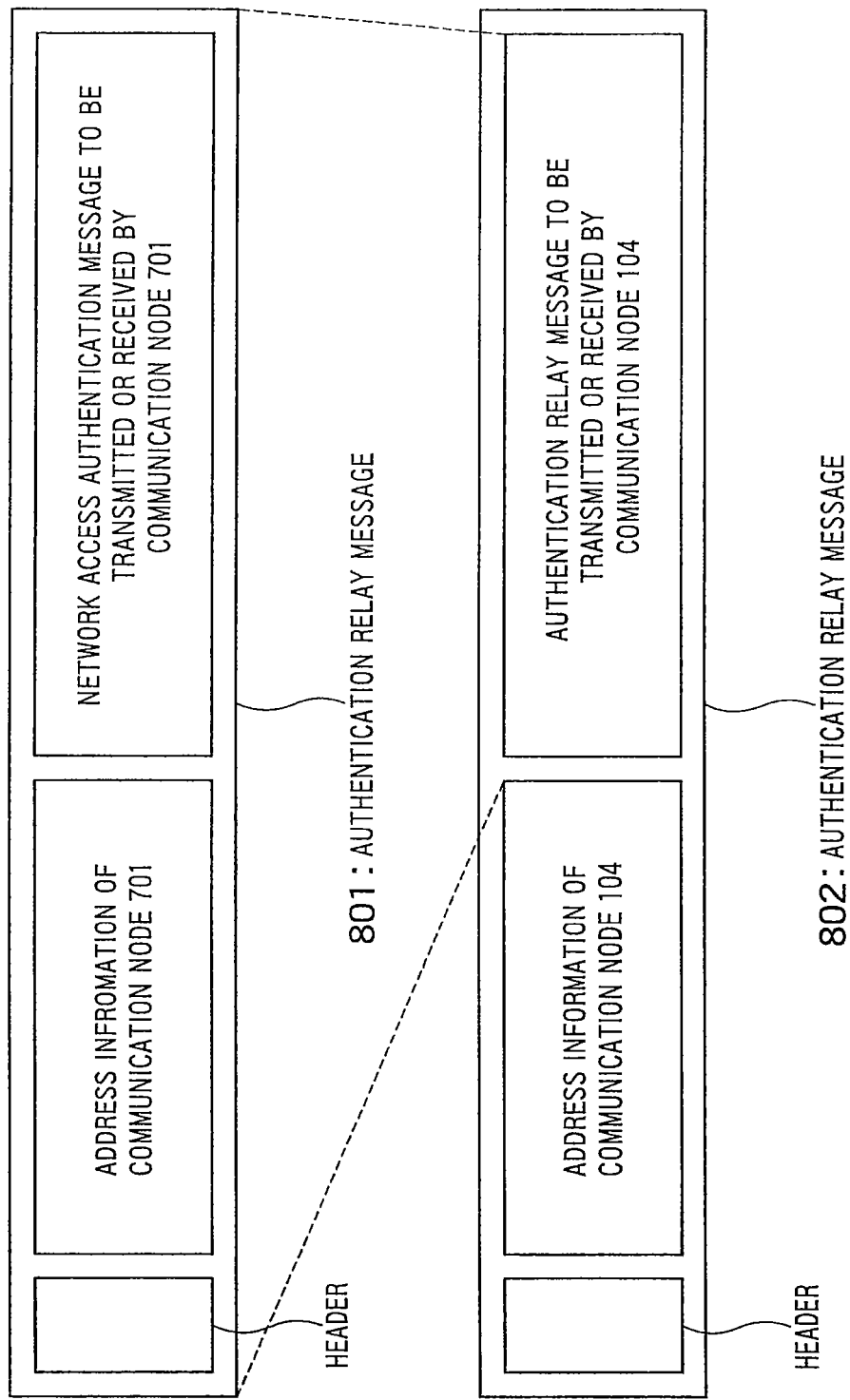
FIG. 9 is a diagram showing an example of authentication relay message in a nesting state.

Thus, in the case of using the multistage of authentication relays, a nesting state where an authentication relay message is further stored in an authentication relay message in FIG. 3 occurs. FIG. 9 shows the authentication relay message in the nesting state. The communication node 104 generates an authentication relay message 801, and the communication node 103 generates an authentication relay message 802 including the authentication relay message 801.

The connection configuration checker 23 in the authentication server 101 identifies the network or the communication node to which the communication node 701 intends to connect, on the basis of the source address of the authentication relay message 801 directly including the network access authentication message exchanged with the communication node 701.

More specifically, the address information of the communication node 104 included in the authentication relay message 802 is used. The address managing table 13 is referred to, the communication node (or the network) matching with the address of the communication node 104 is identified, among the communication nodes and networks to which the communication node 701 is authorized to be connected. Connection to the identified communication node (or network) is then authorized.

As described above, according to this embodiment, even in the case where plural authentication relays exist between the communication node and the authentication server, network access authentication can be achieved in consideration of the connection configuration of the communication nodes.

The authentication server which has been heretofore described may also be realized using a general-purpose computer device as basic hardware. That is, each unit in the server can be realized by causing a processor mounted in the above described computer device to execute a program. In this case, the server may be realized by installing the above described program in the computer device beforehand or may be realized by storing the program in a storage medium such as a CD-ROM or distributing the above described program over a network and installing this program in the computer device as appropriate. Furthermore, the tables or the storages in the server may also be realized using a memory device or hard disk incorporated in or externally added to the above described computer device or a storage medium such as CD-R, CD-RW, DVD-RAM, DVD-R as appropriate.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. An authentication apparatus, including a computer having processing circuitry, the computer being configured to control the authentication apparatus to perform operations, the authentication apparatus comprising:

a communication unit implemented by the computer and configured to receive a message related to network access authentication for a first communication apparatus, the message including an address of the first communication apparatus and an address of an authentication relay, wherein the authentication relay is configured to receive the message transmitted from the first communication apparatus and relay the message to the authentication apparatus;

a verifier implemented by the computer and configured to verify an authenticity of the first communication apparatus based on the address of the first communication apparatus included in the message received by the communication unit; and a connection configuration checker implemented by the computer and configured to identify a first destination connectable by the first communication apparatus, based on the address of the first communication apparatus when verification by the verifier succeeds, and determine whether to authorize that the first communication apparatus connects to the first destination based on matching between the address of the authentication relay and an address of the first destination, wherein the message includes addresses of a plurality of authentication relays, and the connection configuration checker identifies, as the first destination, a communication apparatus or a network having an address matching with the address of the authentication relay having relayed the message first, from among the plurality of authentication relays, wherein the first destination is selected from among communication apparatuses or networks that are preliminarily authorized to be connected to the first communication apparatus, and determines to authorize connection by the first communication apparatus to the first destination.

2. The authentication apparatus according to claim 1, further comprising:
an address manager implemented by the computer,
wherein the connection configuration checker uses address managing information, which represents addresses of a communication apparatus and a network, and detects, as the first destination, the network or the communication apparatus that has an address matching with the address of the first communication apparatus among the communication apparatuses or the networks that are registered in the address managing information, and
the address manager registers the address of the first communication apparatus that has been authorized to be connected, or an address of a network managed by the first communication apparatus, in the address managing information.

3. The authentication apparatus according to claim 1, further comprising:
an address manager implemented by the computer,
wherein the address manager registers the address of the first communication apparatus that has been authorized to be connected, or an address of a network managed by the first communication apparatus, in an address managing information.

4. The authentication apparatus according to claim 1, further comprising:
an address manager implemented by the computer,
wherein the connection configuration checker uses address managing information, which represents an address of a communication apparatus and a network, and detects, as the first destination, the network or the communication apparatus having an address matching with the address of the authentication relay having relayed the message first, from among the communication apparatuses or the networks registered in the address managing information, and
the address manager registers the address of the first communication apparatus that has been authorized to be connected, or the address of the network managed by the first communication apparatus, in the address managing information.

5. The authentication apparatus according to claim 1, wherein, after the first communication apparatus is authorized to be connected to the first destination, the authentication apparatus acquires a latest address of the first communication apparatus through a re-authenticating process or an address updating process.

6. The authentication apparatus according to claim 1, wherein, when the first communication apparatus is authorized to be connected to the first destination, the communication unit notifies the first destination of connection authorization with the first communication apparatus.

7. The authentication apparatus according to claim 6, wherein the communication unit notifies key information to be used for communication with the first communication apparatus to the first destination.

8. The authentication apparatus according to claim 1, wherein, when the first communication apparatus is authorized to be connected to the first destination, the communication unit notifies key information to be used between the first communication apparatus and the first destination to the first communication apparatus.

9. The authentication apparatus according to claim 1, wherein RFC 5191 is used as a network access protocol.

10. An authentication method performed in an authentication apparatus, comprising:
receiving a message related to network access authentication for a first communication apparatus, the message including an address of the first communication apparatus and an address of an authentication relay, wherein the authentication relay is configured to receive the message transmitted from the first communication apparatus and relay the message to the authentication apparatus;
verifying an authenticity of the first communication apparatus based on the address of the first communication apparatus included in the received message; and
identifying a first destination connectable by the first communication apparatus, based on the address of the first communication apparatus when the verifying succeeds, and determining whether to authorize that the first communication apparatus connects to the first destination based on matching between the address of the authentication relay and an address of the first destination,
wherein the message includes addresses of a plurality of authentication relays, and
the identifying step comprises identifying, as the first destination, a communication apparatus or a network having an address matching with the address of the authentication relay having relayed the message first, from among the plurality of authentication relays, wherein the first destination is selected from among communication apparatuses or networks that are preliminarily authorized to be connected to the first communication apparatus, and determining to authorize connection by the first communication apparatus to the first destination.

11. A non-transitory computer readable medium, having instructions stored therein that cause, when executed by a processor, the processor to execute a method comprising:
receiving a message related to network access authentication for a first communication apparatus, the message including an address of the first communication apparatus and an address of an authentication relay, wherein the authentication relay is configured to receive the message transmitted from the first communication apparatus and relay the message to the authentication apparatus;
verifying an authenticity of the first communication apparatus based on the address of the first communication apparatus included in the received message; and
identifying a first destination connectable by the first communication apparatus, based on the address of the first communication apparatus when the verifying succeeds, and determining whether to authorize that the first communication apparatus connects to the first destination based on matching between the address of the authentication relay and an address of the first destination,
wherein the message includes addresses of a plurality of authentication relays, and
the identifying step comprises identifying, as the first destination, a communication apparatus or a network having an address matching with the address of the authentication relay having relayed the message first, from among the plurality of authentication relays, wherein the first destination is selected from among communication apparatuses or networks that are preliminarily authorized to be connected to the first communication apparatus, and determining to authorize connection by the first communication apparatus to the first destination.

\* \* \* \* \*